E. S. FORNEY.
STALK CUTTING MACHINE.
APPLICATION FILED OCT. 7, 1920.
1,375,582.
Patented Apr. 19, 1921.
3 SHEETS—SHEET 1.
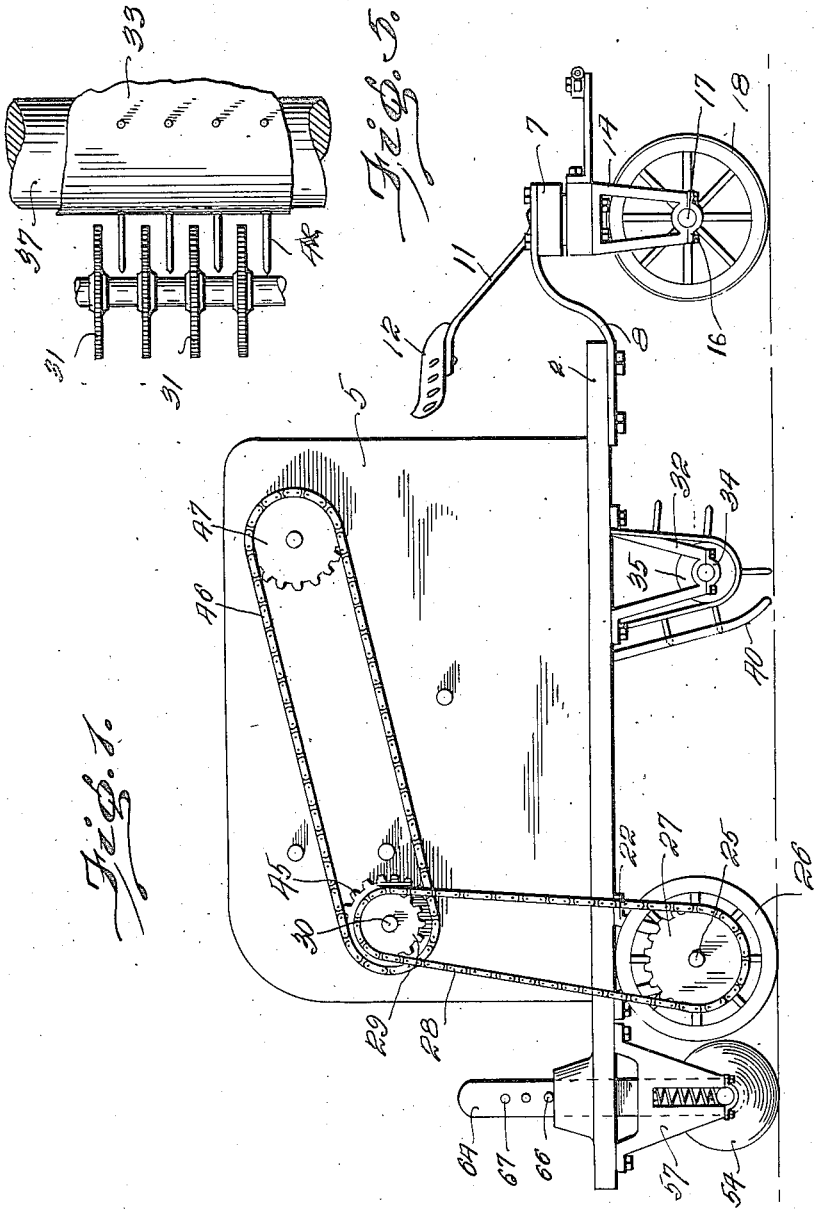

E. S. FORNEY.
STALK CUTTING MACHINE.
APPLICATION FILED OCT. 7, 1920.
1,375,582.
Patented Apr. 19, 1921.
3 SHEETS—SHEET 2.
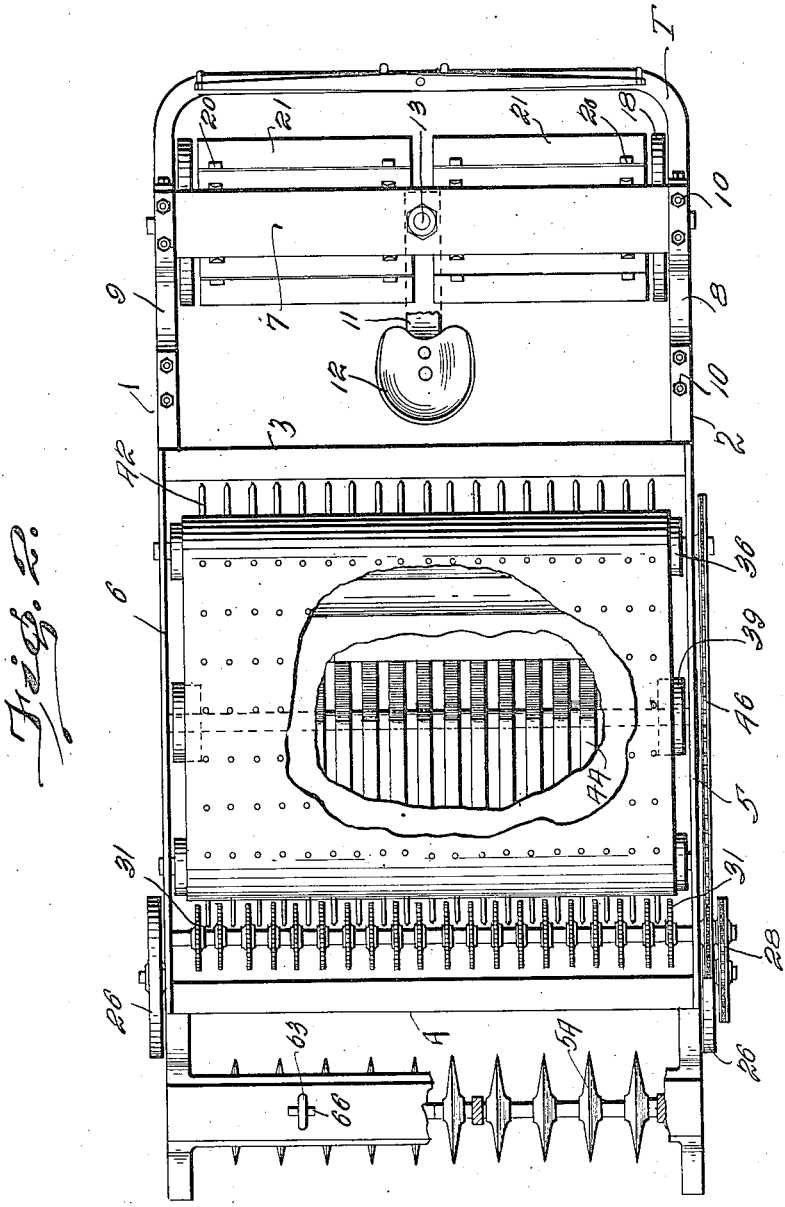

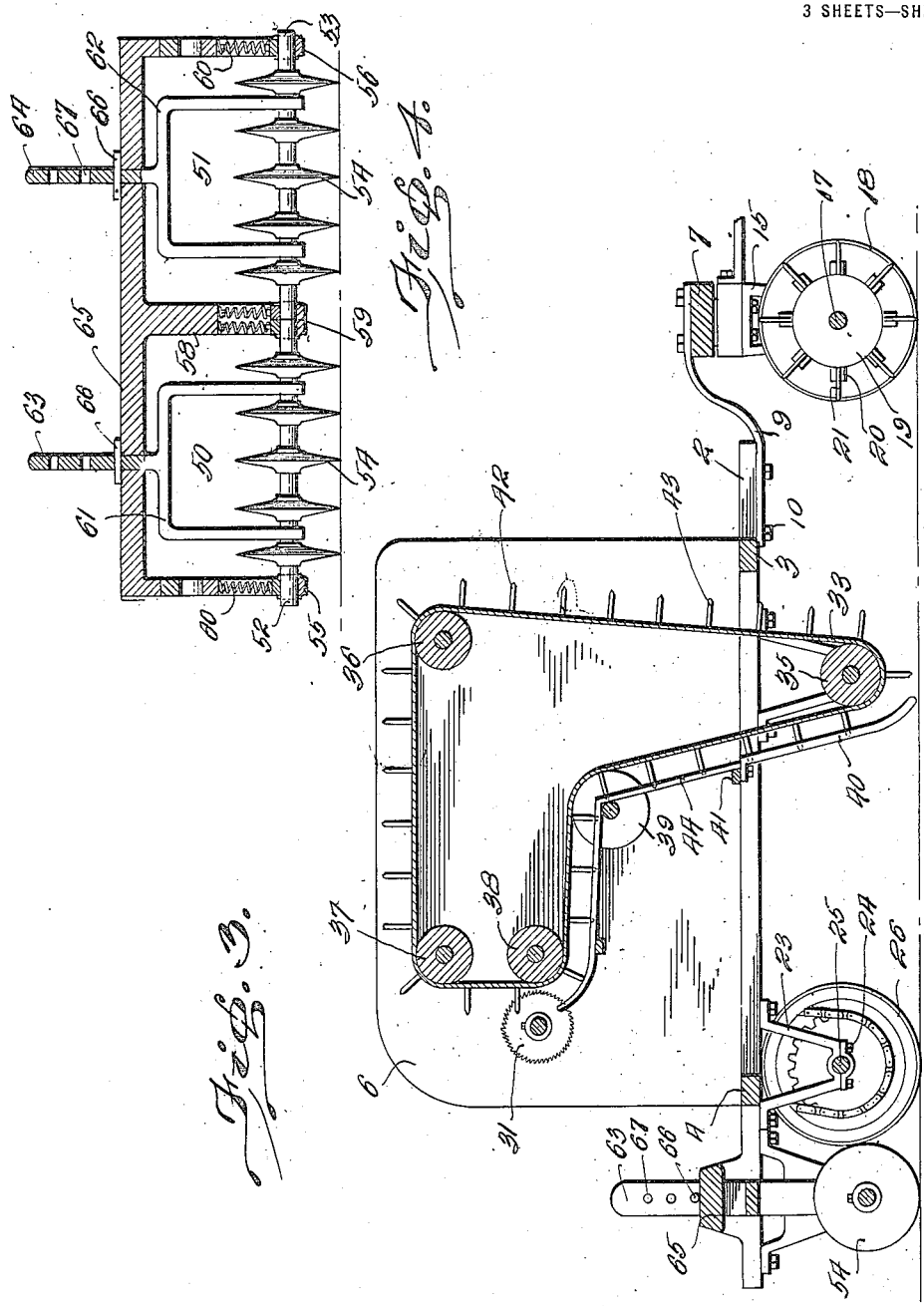

UNITED STATES PATENT OFFICE.

ERNEST S. FORNEY, OF FULLERTON, NEBRASKA.

STALK-CUTTING MACHINE.

1,375,582.  Specification of Letters Patent.  Patented Apr. 19, 1921.

Application filed October 7, 1920. Serial No. 415,400.

*To all whom it may concern:*

Be it known that I, ERNEST S. FORNEY, a citizen of the United States, residing at Fullerton, in the county of Nance and State of Nebraska, have invented certain new and useful Improvements in Stalk-Cutting Machines, of which the following is a specification.

This invention relates to corn stalk cutting machines and more particularly to that class of stalk cutters adapted to cut two or more standing rows of corn stalks and subsequently convey the same to a cutting mechanism and deposit the stalks thus cut on the ground.

The primary object of my invention is directed to a corn stalk cutting machine of the above class wherein a plurality of rows of corn stalks may be conveyed to a series of circular saws and means for covering the cut material beneath the ground.

Another object of my invention resides in the provision of a corn stalk cutting machine adapted to cut down a plurality of corn stalks, convey the same to a plurality of circular saws where the stalks are finely cut up and redeposited on the ground, and adjustable means for covering the cut up material.

A still further object of my invention relates to a corn stalk cutting machine adapted to cut down a plurality of corn stalks, including conveying and cutting means driven from certain of the supporting wheels and vertically adjustable coverers for depositing the cut up material beneath the surface of the ground.

With these objects in view and others which will be manifest and suggested as the nature and purpose of my invention are revealed in the following specification and drawing wherein I have shown a practical, yet preferred embodiment thereof.

Figure 1 is a side elevation of the machine.

Fig. 2 is a plan view of the same, parts being broken away.

Fig. 3 is a vertical, longitudinal section through the machine.

Fig. 4 is a detail showing the covering disks.

Fig. 5 is another detail showing a portion of the cutting mechanism.

Referring to the drawing wherein like parts are designated by the same numerals in the specification, longitudinal beams 1, 2, and front and rear, connecting, transverse beams 3, 4, suitably support the vertical upright sides 5, 6 which confine the conveying and cutting mechanism subsequently to be described.

An elevated transverse beam 7 connected to the longitudinal beams 1, 2 by a pair of depending metallic straps 8, 9 securely held in position by vertical locking bolts and nuts 10, is provided with the usual seat support 11 and seat 12 for the operator of the machine. A front truck T pivotally supported as at 13 intermediate the transverse beam 7 is provided with suitable hangers 14, 15 and journal bearings 16 for the front axle 17 and ground wheels 18 which support the front of the machine. Any suitable draft means may be employed to operate the machine over the field.

Supported by the front axle 17 and intermediate the hangers, I provide a plurality of rotatable cutting elements comprising two pairs of rollers 19 having outstanding pegs 20 which are slit to receive flat, transversely extending cutting blades 21 as clearly shown in Fig. 2 of the drawing. The rollers and the blades carried thereby are so spaced that two rows of corn stalks may be simultaneously cut down as the machine travels over the field, the number of rows to be cut depending of course on the width of the machine.

A pair of hangers 22, 23 suspended from the side beams support in suitable bearings 24, the rear shaft 25 which carries the rear ground wheels 26, sprocket 27 rotatable with one of said ground wheels driving an endless chain 28 trained over another sprocket 29 of a cutter shaft 30.

The transverse shaft 30 which is supported by the vertical sides 5, 6 of the machine is provided with a set of equally spaced circular cutting members 31 preferably fine tooth saws which cut the stalks into short pieces as they are carried by an endless conveyer mechanism now to be described.

Another pair of hangers 32, 33 supported by the side beams of the machine provide bearings 34 for a transverse roller 35. A pair of longitudinally spaced rollers 36, 37 supported in suitable bearings in the sides of the machine are adapted to receive an endless conveyer also trained about the lower roller 35, idlers 38, 39 being provided for the said conveyer for the well known purpose.

A transverse, angularly suspended rake member 40 carried by a transverse beam 41 between the sides of the machine and positioned directly behind the roller 35 is adapted to rake up the falling or knocked down stalks. The endless conveyer 42 is provided with a plurality of transverse, equally spaced teeth 43 which pass between the rake teeth and spaced slats 44 and carry the stalks toward the toothed saws where they are cut into short pieces and deposited on the ground. An additional sprocket wheel 35 on the shaft 30 is provided with a sprocket chain 46 which drives the sprocket 47 on the end of the roller 36 whereby power is communicated to the endless conveyer mechanism from the rear ground wheels.

Positioned rearwardly of the above described mechanism, I provide suitable covering means in the form of two sets of rotatable disks 50, 51, the horizontal shafts 52, 53 supporting the disks 54, rotatable in journal bearings 55, 56 in the side hangers 57 suspended from the side beams and the common central hanger 58 and its bearing 59.

Cushioning springs 60 normally retain the shafts and the disks in contact with the ground being traversed and yokes 61, 62 which support the shafts 52, 53 are provided with vertical extensions 63, 64 which extend through apertures in the top, transverse beam 65. Removable transverse pins 66 pass through apertures 67 in the vertical extensions whereby the yokes carrying the disk shafts may be raised or lowered with respect to the ground and the covering means vertically adjusted to deeply or slightly cover the broken up material deposited on the ground.

It will now be seen that as the machine travels over the corn field the front truck and its cutting means will knock down two or more rows of corn stalks. The rake following the cutting means will engage the stalks thus cut and the endless conveyer will drag the same upwardly until they come in contact with the circular saw, where the stalks are cut into short lengths and deposited on the ground. The covering means following will turn the earth and the cut up material and as will be apparent, the material so cut up will be worked into the ground. The circular saws and endless belt are driven from one of the rear supporting wheels and positive action of the mechanism is thereby had without resorting to any outside power.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In a machine of the class described, a wheel supported frame, means carried at the front of the machine for cutting down a plurality of rows of corn stalks, a rake positioned rearwardly of the stalk cutting means, rollers carried by the frame and an endless belt trained over said rollers cooperating with said rake for conveying the stalks, a plurality of driven saws also cooperating with said endless conveyer for cutting the stalks into short lengths, means for driving the said conveyer and saws from the ground supporting wheels, and adjustable disk elements supported by the rear of the frame.

2. In a machine of the class described, a wheel supported frame, rotatable elements carried at the front of the machine for cutting down a plurality of corn stalks, an angularly suspended rake carried by the frame and rearwardly of the rotatable elements, rollers positioned between the sides of the frame, a hanger suspended in front of said rake and carrying another roller, an endless conveyer trained over said rollers and cooperating with said rake, a plurality of circular saws driven from one of the ground wheels and also cooperating with said endless conveyer, sprockets carried by certain of the rollers and one of the ground wheels, endless chains for driving said sprockets, and vertically adjustable disk elements supported at the rear of the frame.

3. In a machine of the class described, a wheel supported frame, means rotatable with the front ground wheels for cutting down a plurality of rows of corn stalks, an angularly suspended rake extending across the width of the machine, rollers carried between the sides of the machine, an additonal roller positioned in front of the rake, an endless conveyer having transverse teeth and trained over said rollers for cooperating with said rake, a plurality of circular saws cooperating with the endless conveyer whereby the stalks are cut into short lengths, means for driving the endless conveyer and said saws from one of the ground wheels, and vertically adjustable, revolving means supported by the rear of the machine.

4. In a machine of the class described, a wheel supported frame, rotatable cutting elements driven by the front supporting wheels for cutting down a plurality of rows of corn stalks, an angular rake suspended from and secured to the frame, hangers carried by the side beams of the frame and supporting a roller in front of the rake, additional rollers supported between the sides of the machine, an endless conveyer having spaced, transverse teeth formed therein trained about said rollers and coöperating with the rake, a transverse shaft and a plurality of circular saws rotatable therewith also carried by the sides of the machine and coöperating with said endless conveyer, means for driving said endless conveyer and said saws from one of the ground wheels, and vertically adjustable revolving elements in direct alinement with the front cutting elements.

5. In a machine of the class described, a wheel supported frame, rotatable cutting elements driven by the front supporting wheels for cutting down a plurality of rows of corn stalks, an angularly suspended rake secured between the vertical sides of the frame, hangers carrying rollers positioned in proximity to the ground and directly in front of said rake, additional rollers supported between the sides of the frame, an endless conveyer having transversely spaced teeth thereon, and extending approximately across the width of the machine and coöperating with said rake, circular driven saws also coöperating with said endless conveyer for cutting the stalks into short lengths, means for driving the said saws and conveyer from one of the ground wheels, and a pair of revolving vertically adjustable ground breaking elements positioned rearwardly of the machine.

In testimony whereof I affix my signature hereto.

ERNEST S. FORNEY.